(12) United States Patent
Murakawa et al.

(10) Patent No.: US 8,507,395 B2
(45) Date of Patent: Aug. 13, 2013

(54) DIELECTRIC CERAMIC COMPOSITION AND CERAMIC ELECTRONIC DEVICE

(75) Inventors: Yoshitaka Murakawa, Tokyo (JP); Yukie Nakano, Tokyo (JP); Shirou Ootsuki, Tokyo (JP)

(73) Assignee: TDK Corporation, Tokyo (JP)

( * ) Notice: Subject to any disclaimer, the term of this patent is extended or adjusted under 35 U.S.C. 154(b) by 87 days.

(21) Appl. No.: 13/221,246

(22) Filed: Aug. 30, 2011

(65) Prior Publication Data

US 2012/0050941 A1    Mar. 1, 2012

(30) Foreign Application Priority Data

Aug. 31, 2010 (JP) .................................. 2010-195107

(51) Int. Cl.
*C04B 35/468* (2006.01)
(52) U.S. Cl.
USPC .......................... 501/139; 428/701; 428/702
(58) Field of Classification Search
USPC ................. 501/139; 428/701, 702
See application file for complete search history.

(56) References Cited

U.S. PATENT DOCUMENTS

| | | | |
|---|---|---|---|
| 6,614,644 B2 | 9/2003 | Chazono et al. | |
| 8,184,427 B2 * | 5/2012 | Yamazaki | 361/321.4 |
| 8,192,851 B2 * | 6/2012 | Aman et al. | 428/701 |
| 2008/0226944 A1 | 9/2008 | Aman et al. | |

FOREIGN PATENT DOCUMENTS

| | | | |
|---|---|---|---|
| JP | A-2001-230149 | | 8/2001 |
| JP | 2002284571 | * | 10/2002 |
| JP | A-2008-222520 | | 9/2008 |

* cited by examiner

*Primary Examiner* — Karl Group
(74) *Attorney, Agent, or Firm* — Oliff & Berridge, PLC

(57) ABSTRACT

A dielectric ceramic composition comprising a compound expressed by a formula of $ABO_3$, where "A" is Ba alone, or Ba and at least one selected from Ca and Sr, and "B" is Ti alone, or Ti and Zr, and having a perovskite-type crystal structure, and an oxide of a rare-earth element including Sc and Y. The dielectric ceramic composition includes a dielectric particle having a core-shell structure which has a core and a shell, the shell being present around the core and including at least "R" element, and in the shell, a region showing a maximum content rate of "R" element is a boundary region between the core and the shell.

5 Claims, 4 Drawing Sheets

DIELECTRIC CERAMIC COMPOSITION AND CERAMIC ELECTRONIC DEVICE

BACKGROUND OF THE INVENTION

1. Field of the Invention

The present invention relates to a dielectric ceramic composition and a ceramic electronic device. Further specifically, the present invention relates to a dielectric ceramic composition combining specific permittivity and reliability, and a ceramic electronic device in which the dielectric ceramic composition is applied to a dielectric layer.

2. Description of the Related Art

Recently, with densification of electronic circuits, demands for downsizing of an electronic device are increased, which is associated with promoting downsizing and increase in capacity of for example a multilayer ceramic capacitor, and further improvements in properties are required.

In response to such a demand, by forming a dielectric particle included in a dielectric ceramic composition with two phases having different properties, improvement in various properties has been sought.

For example, the Japanese Unexamined Patent Publication No. 2001-230149 discloses a multilayer ceramic capacitor having a dielectric layer comprising a dielectric particle having a core-shell structure. It is disclosed that in this capacitor, a shell portion includes an acceptor-type element such as Mn; Mg; and a rare-earth element, wherein concentrations of the acceptor-type element and the rare-earth element included in the shell portion are gradually increased towards a crystal grain boundary from a boundary between a core portion and the shell portion.

However, in the capacitor disclosed in the Japanese Unexamined Patent Publication No. 2001-230149, because distribution of the rare-earth element in the shell portion is the above-described distribution, there is a problem that it is hard to combine specific permittivity and reliability.

Also, the Japanese Unexamined Patent Publication No. 2008-222520 discloses a dielectric ceramic composition comprising a dielectric particle having a surface diffusion structure which comprises a central layer substantially consisting of a main component and a diffusion layer surrounding the central layer in which rare-earth elements are diffused in the main component. It is disclosed that the dielectric ceramic composition has a feature that concentration of the rare-earth element inside the diffusion layer is higher than concentration of the rare-earth element near an interface between the diffusion layer and a crystal grain boundary.

However, in the dielectric ceramic composition disclosed in the Japanese Unexamined Patent Publication No. 2008-222520, specific permittivity may be low and specific permittivity and reliability may not fully be combined.

BRIEF SUMMARY OF THE INVENTION

The present invention has been made in view of the above situations, and is intended to provide a dielectric ceramic composition, showing high specific permittivity (e.g. 3000 or more) and good reliability, and a ceramic electronic device in which the dielectric ceramic composition is applied to a dielectric layer.

In order to attain the above purpose, the dielectric ceramic composition according to the present invention comprises a compound expressed by a formula of $ABO_3$ and having perovskite-type crystal structure, and an oxide of an "R" element. "A" is Ba alone, or Ba and at least one selected from Ca and Sr; "B" is Ti alone, or Ti and Zr; and the "R" element is at least one selected from Sc, Y, La, Ce, Pr, Nd, Pm, Sm, Eu, Gd, Tb, Dy, Ho, Er, Tm, Yb and Lu. The dielectric ceramic composition also includes a dielectric particle having a core-shell structure which has a core and a shell, the shell being present around the core and including at least "R" element In the shell, a region showing a maximum content rate of the "R" element is a boundary region between the core and the shell.

In the present invention, a diffusion state of "R" element in the dielectric particle having a core-shell structure is controlled to show largest content rate of the "R" element in the boundary region between the core and the shell. It is possible thereby to obtain a dielectric ceramic composition showing improved specific permittivity as well as good reliability.

Preferably, the "R" element is not substantially included in the core, and in a direction from an outer peripheral portion of the shell toward the boundary region, content rate of the "R" element is progressively increased.

Preferably, when a maximum value of content rate of the "R" element is defined as "Rmax", and an average value of content rate of the "R" element in the shell is defined as "Rave", "Rmax" and "Rave" satisfy a relation of $1.1 \leq Rmax/Rave \leq 2.0$.

By making the diffusion state of "R" element as above, effects of the present invention can be further increased.

Also, the ceramic electronic device according to the present invention has a dielectric layer constituted by any one of the above-mentioned dielectric ceramic compositions, and an electrode. As the ceramic electronic device, although not particularly limited, there may be illustrated a multilayer ceramic capacitor, piezo element, chip inductor, chip varistor, chip thermistor, chip resistor and other surface mount chip-type electronic devices (SMD).

DETAILED DESCRIPTION OF THE INVENTION

Figure 1:
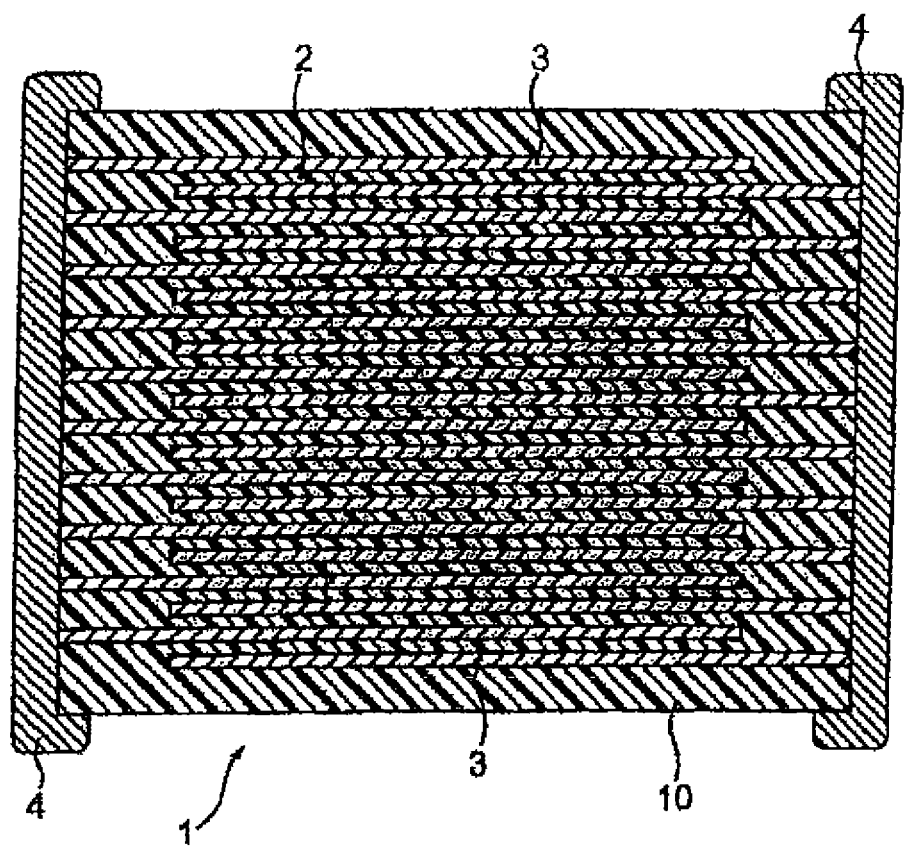
FIG. 1 is a cross-sectional view of a multilayer ceramic capacitor according to one embodiment of the present invention.

Hereinafter, the present invention will be explained based on the embodiment shown in the drawings.

(Multilayer Ceramic Capacitor 1)

As shown in FIG. 1, a multilayer ceramic capacitor 1 comprises a capacitor element body 10 having a structure in which a dielectric layer 2 and an internal electrode layer 3 are alternately stacked. A pair of external electrodes 4 is formed on both end portions of the capacitor element body 10, and respectively conducted with the internal electrode layers 3 alternately arranged inside the element body 10. Shape of the capacitor element body 10 is not particularly limited, and is normally rectangular parallelepiped. Also, the dimensions are not particularly limited, and are suitably determined depending on the use.

(Dielectric Layer 2)

The dielectric layer 2 is composed of the dielectric ceramic composition according to the present embodiment. The dielectric ceramic composition includes a compound expressed by a formula $ABO_3$ (where "A" is Ba alone, or Ba and at least one selected from Ca and Sr, and "B" is Ti alone, or Ti and Zr) as its main component, and includes an oxide of "R" element as its subcomponent. Note that an amount of oxygen (O) may slightly be deviated from its stoichiometric composition.

The compound can specifically be a compound expressed by a composition formula $(Ba_{1-x-y}Ca_xSr_y).(Ti_{1-m}Zr_m)O_3$ and having a perovskite-type crystal structure. Also, as a site "A" element, at least Ba is included, and as a site "B" element, at least Ti is included. Furthermore, a molar ratio of the site "A" element (Ba, Sr and Ca) and the site "B" element (Ti and Zr) can be expressed by A/B ratio, and in the present embodiment, the A/B ratio is preferably 0.98 to 1.02.

Note that in the present embodiment, it is particularly preferable that a relation of $x=y=m=0$ is satisfied in the above formula, i.e. the compound is barium titanate.

Content of the oxide of "R" element is, in terms of "R" element, preferably 0.1 to 5 moles, more preferably 0.5 to 2 moles, per 100 moles of the compound expressed by $ABO_3$. When the content of the oxide of "R" element is controlled within the above range, it results in an advantage that it is easy to combine high specific permittivity and good reliability. Note that the "R" element is at least one selected from Sc, Y, La, Ce, Pr, Nd, Pm, Sm, Eu, Gd, Tb, Dy, Ho, Er, Tm, Yb and Lu; is preferably at least one selected from Y, Ho, Dy and Yb; and is more preferably at least one selected from Y, Dy and Yb.

Note that in the present embodiment, if necessary, other components may be included.

For example, an oxide of Mg may be included. The content is, in terms of Mg element, preferably 0.5 to 3 moles per 100 moles of the compound expressed by $ABO_3$. By setting the content of the oxide within the above range, it brings an advantage that crystal particle size of the dielectric particle can easily be controlled to make the diffusion state of the "R" element desirable.

Also, for example, an oxide of at least one element selected from Mn, Cr, Co, Fe and Cu may be included. The content of the oxide is, in terms of each element, preferably 0.1 to 1 mole per 100 moles of the compound expressed by $ABO_3$. By setting the content of the oxide within the above range, it brings an advantage that it is easy to control diffusion of the "R" element into the core to make the diffusion state of the "R" element desirable. Note that among such oxides, it is preferable to use an oxide of Mn and/or an oxide of Cr because of its large improvement effect in properties.

Also, for example, an oxide of at least one element selected from V, Mo and W may be included. The content of the oxide is, in terms of each element, preferably 0.05 to 0.5 mole per 100 moles of the compound expressed by $ABO_3$. By setting the content of the oxide within the above range, it brings an advantage that it is easy to control diffusion of the "R" element into the core to make the diffusion state of the "R" element desirable. Note that among such oxides, it is preferable to use an oxide of V because of its large improvement effect in properties.

Also, for example, an oxide containing Si may be included. The content of the oxide is, in terms of Si element, preferably 0.5 to 3 moles per 100 moles of the compound expressed by $ABO_3$. By setting the content of the oxide within the above range, it brings an advantage that it is easy to control firing temperature and holding time to make the diffusion state of the "R" element desirable. Note that as the oxide containing Si, an oxide of Si, or a composite oxide of Si with at least one selected from Li, B, Al, Ba and Ca are preferable.

Thickness of the dielectric layer 2 is not particularly limited and may suitably be determined depending on desired properties, the use and the like.

(Structure of Dielectric Particle)

In the present embodiment, a dielectric particle 20 included in the dielectric ceramic composition making the above dielectric layer 2 is the particle in which subcomponent elements such as the "R" element are solid-solute (diffused) in the main component particle ($ABO_3$ particle).

Figure 2:
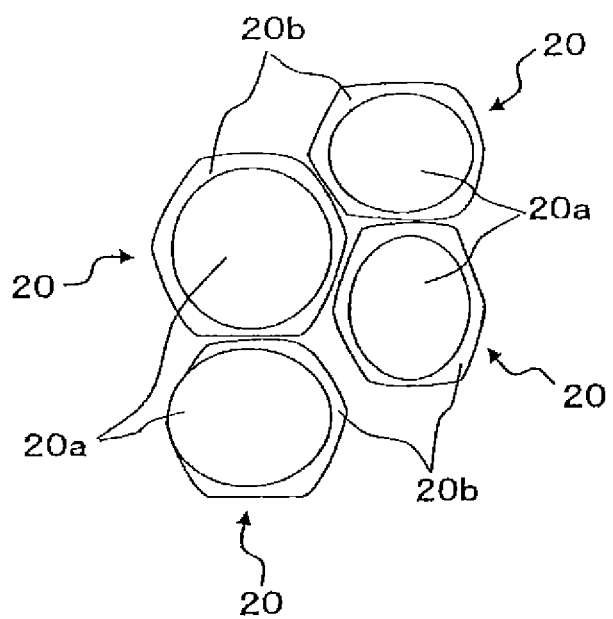
FIG. 2 is an enlarged cross-sectional view of a key part of a dielectric layer 2 shown in FIG. 1.

As shown in FIG. 2, the dielectric particle 20 comprises a core 20a, composed of substantially main component ($ABO_3$) and a shell 20b existing around the core 20a, in which components other than the elements constituting the main component are diffused in the main component. Namely, the dielectric particle 20 has a core-shell structure.

In the present embodiment, the core 20a is substantially composed of the main component, and shows ferroelectricity. On the other hand, in the shell 20b, the "R" element is diffused (solid-solute) in the main component. As a result, the shell 20b loses ferroelectricity and shows paraelectricity. In the present embodiment, in the shell 20b, not only the "R" element but also other elements may exist.

A method for distinguishing between the core 20a and the shell 20b in the dielectric particle 20 is not particularly limited, and for example, it may be determined based on two phases having different contrast observed in the dielectric particle in a bright-field image by a scanning transmission electron microscope (STEM). Alternatively, it may be determined by distribution of content rate of other elements except for the elements constituting the main component in the dielectric particle by using an energy-dispersive x-ray spectrometer (EDS) equipped with a scanning transmission electron microscope (STEM).

Existing rate of the dielectric particle 20 having a core-shell structure is, in terms of number of particles, preferably 70 to 100% when the number of all dielectric particles constituting the dielectric layer 2 is defined as 100%.

Note that it is normally determined whether the core-shell structure is present or not, by difference in contrast between the core and the shell or contrasting density of the solute "R" element in the main component based on a cross-sectional picture of the dielectric layer 2. Therefore, there are particles actually having core-shell structure in which only the shell regions appear in the cross-sectional picture. In this case, the particles are not determined to have core-shell structure, so that the upper limit of the rate of the dielectric particle 20 having a core-shell structure can apparently be 80% or so.

Figure 3:
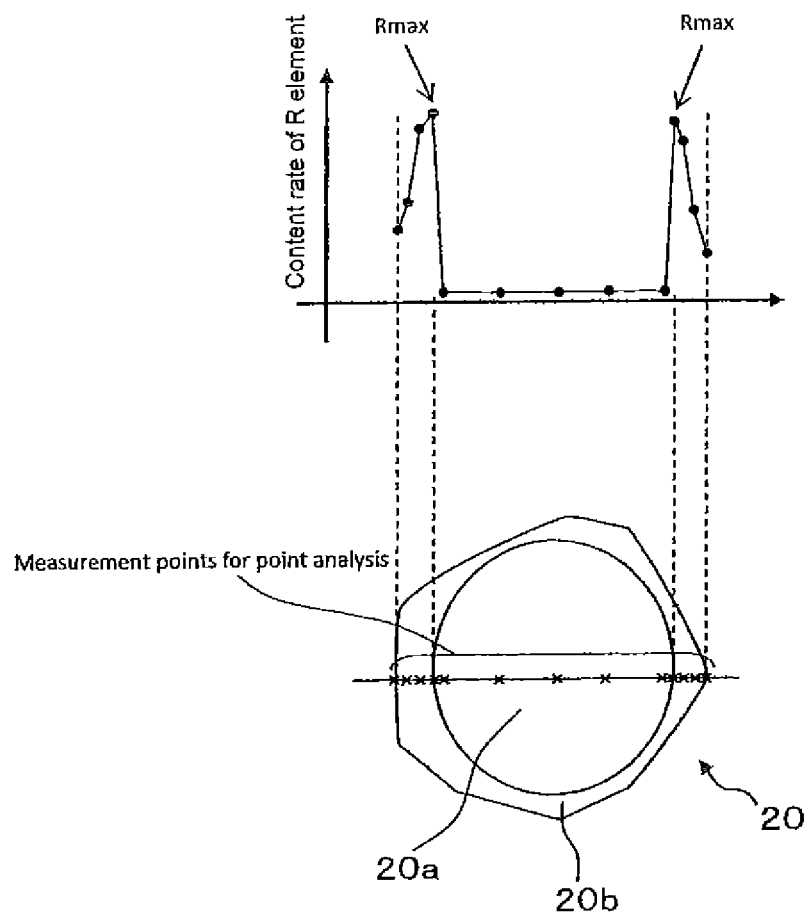
FIG. 3 is a diagram for explaining a distribution of content rate of "R" element in a dielectric particle included in a dielectric ceramic composition according to one embodiment of the present invention, and one example of measurement methods thereof.

Then, for the predetermined number of dielectric particles having core-shell structure, point analysis is performed on a line passing through the approximate center of the dielectric particle 20 as shown in FIG. 3, by using EDS equipped with STEM. When the maximum value of content rate of the "R" element obtained by analyzing characteristic X-ray obtained by the analysis is defined as "Rmax", in the present embodiment, Rmax is shown in the boundary region between the core 20a and the shell 20b.

Thus, by having the maximum content rate of the "R" element in the boundary region between the core and the shell, it is possible to improve specific permittivity and to obtain good high temperature accelerated lifetime.

Also, since more portions showing ferroelectricity results in improvement in specific permittivity, it is preferable that "R" element is not substantially included in the core. It is also preferable that the area of the shell is small.

Note that in the present embodiment, ""R" element is not substantially included" means, for example, that the content rate of the "R" element in the core may be 0.2 mol % or less.

Furthermore, from the obtained distribution of content rate of the "R" element, an average value "Rave" of content rate of the "R" element in the shell 20b can be calculated. In the present embodiment, thus obtained Rmax and Rave satisfy the relation of preferably 1.1≦Rmax/Rave≦2.0, more preferably 1.2≦Rmax/Rave≦1.6. By making Rmax/Rave satisfying the above relation, Rmax is attained in the boundary region between the core and the shell, and a clear peak appears in the distribution of content rate of the "R" element, so that the above-mentioned effect can further be enhanced.

Note that the number of measurement points is, although not particularly limited, preferably 10 points per one dielectric particle. Also, the number of dielectric particles to be measured is, although not particularly limited, for example, preferably 10 or more.

Also, in the present embodiment, the dielectric particles 20 showing the maximum value of content rate of the "R" element in the boundary region between the core and the shell are, in terms of number of particles, preferably 55% or more, more preferably 70% or more, per all dielectric particles.

The above-mentioned diffusion state of the "R" element can be achieved by controlling firing conditions, particle size distribution of raw powder of $ABO_3$, a method for adding raw material of the oxide of "R" element, etc., as mentioned below.

In the present embodiment, crystal particle size of the dielectric particle may be determined depending on the thickness of the dielectric layer 2 and the like. The crystal particle size may be measured by, for example, the following way. Namely, the capacitor element body 10 is first cut in a plane parallel to a stacking direction of the dielectric layer 2 and the internal electrode layer 3. Then, on the cross-sectional surface, an average area of the dielectric particles are measured to calculate a diameter as an equivalent circle diameter, and a value obtained by multiplying the calculated diameter by 1.5 is defined as a crystal particle size.

A method for calculating an average crystal particle size from the obtained crystal particle size is not particularly limited, and for example, an average crystal particle size may be defined as a value having cumulative frequency of 50% based on a cumulative frequency distribution of crystal particle sizes obtained by measuring crystal particle sizes of 200 or more dielectric particles.

(Internal Electrode Layer 3)

Electrically conducting material included in the internal electrode layer 3 shown in FIG. 1 is not particularly limited, and when the dielectric ceramic composition constituting the dielectric layer 2 has resistance to reduction, relatively inexpensive base metal can be used. As the base metal used for the electrically conducting material, Ni or Ni alloy is preferable. Also, the internal electrode layer 3 may be formed by using commercially-available electrode paste. Thickness of the internal electrode layer 3 may suitably be determined depending on the use and the like.

(External Electrode 4)

Electrically conducting material included in the external electrode 4 shown in FIG. 1 is not particularly limited, and inexpensive Ni, Cu and alloys thereof can be used in the present embodiment. Thickness of the external electrode 4 may suitably be determined depending on the use and the like.

(Method for Manufacturing Multilayer Ceramic Capacitor 1)

The multilayer ceramic capacitor 1 according to the present embodiment can be manufactured by producing a green chip by normal printing method or sheet method using a paste, and firing the same, followed by printing or transferring an external electrode thereon to bake the same, as with conventional multilayer ceramic capacitors. Hereinafter, the method for manufacturing will specifically be explained.

First, dielectric raw material for forming the dielectric layer is prepared, and formed into a paste to prepare a dielectric layer paste.

As the dielectric raw material, raw materials of $ABO_3$ and raw materials of the oxide of "R" element are first prepared. For these raw materials, oxides of the above mentioned components, mixture thereof and composite oxides can be used. Also, it is possible to suitably select from a variety of other compounds to become the above mentioned oxides and composite oxides after firing such as carbonate, oxalate, nitrate, hydroxide and organometallic compound, and to mix to use.

Note that as the raw materials of $ABO_3$, it is possible to use materials produced by various methods such as a variety of liquid phase methods (e.g. oxalate method, hydrothermal synthesis method, alkoxide method, sol-gel method, etc.) in addition to so-called solid-phase method.

In the present embodiment, as the raw materials of $ABO_3$, raw powder of $ABO_3$ is used, and as the raw materials of the oxide of "R" element, solution raw material of the oxide of "R" element is used.

As the raw powder of $ABO_3$, it is preferable to use those having an average particle size of 50 to 400 nm. In the raw powder of $ABO_3$, when the particle size in which cumulative number is 10% is D10; the particle size in which cumulative number is 50% is D50; and the particle size in which cumulative number is 90% is D90, D50 indicates the average particle size.

In the present embodiment, "D90/D50" of the raw powder of $ABO_3$ is preferably 1.4 or less, more preferably 1.2 or less. "D50/D10" of the raw powder of $ABO_3$ is preferably 2.0 or more, more preferably 2.4 or more. "D90/D50" is an index of rate of particle (coarse grain) having larger particle size than D50 included in the raw powder, and "D50/D10" is an index of rate of particle (fine grain) having smaller particle size than D50 included in the raw powder.

When "D90/D50" and "D50/D10" are within the above ranges, the raw powder of $ABO_3$ includes relatively small amount of coarse grains, and a certain level or more of amount of fine grains, which is preferred for manufacturing the multilayer ceramic capacitor according to the present embodiment.

Note that a method for measuring particle size of the raw powder is not particularly limited, and for example, there may be mentioned a laser diffraction scattering method using information of diffracted light/scattering light obtained depending on the particle size.

The solution raw material of the oxide of "R" element is not particularly limited, and for example, there may be mentioned those in which alkoxide, complex or salt of the "R" element is added to solvent, etc. The solvent may suitably be selected depending on solute, and for example, may either be water or organic solvent.

Also, when other components except for the above components are included in the dielectric layer, raw materials of the other components are prepared. As the raw materials, oxides of the components, mixture thereof, composite oxides, and a variety of compounds to become the above mentioned oxides and composite oxides after firing can be used. Also, as with the raw materials of the oxide of "R" element, solution raw material may be used.

Next, in the present embodiment, the raw powder of $ABO_3$ and the solution raw material of the oxide of "R" element are mixed to obtain a solution mixture of raw materials. In the mixture of raw materials, the raw powder of $ABO_3$ and the raw material of the oxide of "R" element are uniformly dispersed in the solvent. Mixing is performed by using, for example, ball mill for 4 to 48 hours or so. Also, at this time, a dispersing agent may be added.

The obtained raw material mixture is dried. In the raw material mixture after drying, the surface of the $ABO_3$ particle is covered with the "R" element or compound thereof. Namely, the "R" element and the like are physically or chemically adsorbed onto the $ABO_3$ particle to cover the particle surface.

Note that a drying method is not particularly limited, and may suitably be selected from ventilation drying, spray drying, freeze-dry and the like. Also, drying temperature is not particularly limited, and may be a temperature able to remove the solvent of the raw material mixture.

Then, the raw material mixture after drying may be used as dielectric raw material, and may further be subjected to heat treatment. By performing the heat treatment, the "R" element covering on the surface of the $ABO_3$ particle can be adhered to the particle more firmly. For the heat treatment, for example, rotary kiln, tunnel furnace or batch furnace can be used. Holding temperature at the heat treatment is preferably in the range of 300 to 800° C. Also, holding time is preferably in the range of 0 to 4 hours. Note that drying and heat treatment of the raw material mixture may be done simultaneously. As the method for doing these treatments simultaneously, for example, there may be mentioned spray-pyrolysis technique, etc.

After the heat treatment, since the raw material mixture is agglomerated, the raw material mixture may be pulverized to crumble the agglomerate. Note that the pulverization may be done at the after-mentioned preparation of dielectric layer paste.

Average particle size of the raw material mixture after heat treatment is normally 0.1 to 1 μm or so. Then, the obtained raw material mixture after heat treatment (dielectric raw material) is formed into a paste to prepare dielectric layer paste. At this time, raw materials of other components, which have not been added as the solution raw material, may be added. The dielectric layer paste may be dielectric raw material either be an organic paste obtained by kneading the dielectric raw material and organic vehicle, or water-based paste.

The organic vehicle is obtained by dissolving a binder in an organic solvent. The binder used for the organic vehicle is not particularly limited, and may be suitably selected from various normal binders such as ethyl cellulose, polyvinyl butyral and the like. Also, the organic solvent is not particularly limited, and may be suitably selected from various solvents such as terpineol, butyl carbitol, acetone, toluene and the like depending on the applied methods such as printing method or sheet method.

Also, when the dielectric layer paste is prepared as the water-based paste, the water-based vehicle obtained by dissolving a water soluble binder, a dispersing agent or so in water, and the dielectric material may be kneaded. The water-soluble binder used for the water-based vehicle is not particularly limited, and for example, polyvinyl alcohol, cellulose, water-soluble acrylic resin and the like can be used.

An internal electrode layer paste is prepared by kneading the electrically conducting materials constituted by the above mentioned various conducting metals and the alloys, or the various oxides, organic metal compound and resinate, etc., which become the above-mentioned electrically conducting materials after firing, with the above-mentioned organic vehicle.

The external electrode paste may be prepared as with the above mentioned internal electrode layer paste.

Content of the organic vehicle in each of the above mentioned paste is not particularly limited, and may be normal content. For example, the binder may be 1 to 5 wt % or so, the solvent may be 10 to 50 wt % or so. Also, in each paste, additives selected from various dispersing agent, plasticizer, dielectric, insulator and the like may be included if needed. A total amount thereof is preferably 10 wt % or less.

When using the printing method, the dielectric layer paste and the internal electrode layer paste are printed on a substrate such as PET and the like, stacked and cut into a predetermined shape, so that a green chip is obtained by removing from the substrate.

Also, when using the sheet method, a green sheet is formed by using the dielectric layer paste, and after printing the internal electrode layer paste thereon, these are stacked and cut into a predetermined shape to obtain a green chip.

Binder removal treatment is performed to the green chip, before firing. As for the binder removal conditions, a temperature rising rate is preferably 5 to 300° C./hr, a holding temperature is preferably 180 to 400° C. and a temperature holding time is preferably 0.5 to 24 hrs. Also, binder removal atmosphere is air or at reduced atmosphere.

After the binder removal treatment, the green chip is fired. A temperature rising rate at firing is preferably 500° C./hr or more. A holding temperature at firing is preferably 1300° C. or less, more preferably 1000 to 1200° C., and a holding time is preferably 0.5 hours or less.

Firing atmosphere is preferably reduced atmosphere, and as for an atmosphere gas, for example, a wet mixture gas of $N_2$ and $H_2$ may be preferably used.

Also, an oxygen partial pressure when firing may be suitably decided depending on a kind of the electrically conducting material in the internal electrode layer paste. When using base metal such as Ni or Ni alloy and the like as the electrically conducting material, the oxygen partial pressure in the firing atmosphere is preferably $10^{-14}$ to $10^{-10}$ MPa. A temperature descending rate at firing is preferably 50 to 500° C./hr.

It is preferable to perform an annealing to the capacitor element body after firing under the reduced atmosphere. The annealing is the treatment for a reoxidation of the dielectric layer, and thereby IR lifetime (lifetime of insulation resistance) can be made extremely longer, so that the reliability is improved.

An oxygen partial pressure in the annealing atmosphere is preferably $10^{-9}$ to $10^{-5}$ MPa. Also, a holding temperature at the annealing is preferably 1100° C. or below, particularly preferably 1000 to 1100° C. Note that the annealing can only be constituted by the temperature rising process and temperature descending process. Namely, the temperature holding time may be 0.

As for other annealing conditions, a temperature holding time is preferably 0 to 20 hrs and a temperature descending rate is preferably 50 to 500° C./hr. Also, as for an atmosphere gas of the annealing, for example, it is preferable to use wet $N_2$ gas and the like.

In the above mentioned binder removal treatment, firing and annealing, for example, a wetter and the like may be used in order to wet the $N_2$ gas, mixture gas and the like. In this case, a water temperature is preferably 5 to 75° C. or so.

The binder removal treatment, firing and annealing may be performed continuously or individually.

An end face polishing is conducted to thus-obtained capacitor element body, for example, by a barrel polishing or a sandblast, and then, an external electrode paste is printed to bake, so that an external electrode 4 is formed. Then, if needed, a covering layer is formed on a surface of the external electrode 4 by plating and the like.

Thus produced multilayer ceramic capacitor of the present embodiment can be used for various electronic components and the like by mounting the same on a print circuit board and the like by soldering or so.

In the present embodiment, by controlling the distribution of the particle size of the $ABO_3$ particle, the method for adding raw material of the oxide of "R" element or firing conditions within the above ranges, it is easily attained that the content rate of the "R" element in the boundary region between the core and the shell is "Rmax", and furthermore, it is easy to have the above-mentioned relation of "Rmax" and "Rave".

Although reasons for attaining the constitution as above are not necessarily understood, for example, it may be attainable through the following process.

As stated above, by using the raw powder of $ABO_3$ and the solution raw material of the oxide of "R" element to prepare the dielectric raw material, the surface of the raw powder of $ABO_3$ is covered with the "R" element. At sintering, it is considered that solid solution reaction can occur between $ABO_3$ and the "R" element in the covered particle.

In the raw powder of $ABO_3$, the particle (coarse grain) having relatively large particle size is relatively low in reactivity. Therefore, at firing, the "R" element covering the particle is solid-solute around the $ABO_3$ particle, but because of the solid-solute "R" element, there is almost no oxygen deficiency in the central part of the $ABO_3$ particle. On the contrary, it seems to be hard for "R" element to be further solid-solute in the $ABO_3$ particle.

As a result, it is considered to easily form the particle such that the "R" element is solid-solute around the $ABO_3$ particle at relatively high rate.

On the other hand, in the raw powder of $ABO_3$, the particle (fine grain) having relatively small particle size is relatively high in reactivity. Therefore, at firing, the "R" element covering the particle can easily be reacted with the particle even at relatively low temperature for a short time, and as a result, it may be easy to form the particle such that the "R" element is completely solid-solute in the $ABO_3$ particle.

Then, it is considered that the particle such that the "R" element is solid-solute around the $ABO_3$ particle is surrounded by the particle such that the "R" element is completely solid-solute in the $ABO_3$ particle, which is sintered to generate the dielectric particle 20.

In the dielectric particle 20, the core is composed of the $ABO_3$ particle (derived from coarse grain) in which few "R" elements are solid-solute, and the shell is composed of the $ABO_3$ particle (derived from coarse grain) in which the "R" elements are solid-solute at relatively high rate, and the $ABO_3$ particle (derived from fine grain) in which the "R" element is completely solid-solute.

In the shell, the content rate of the "R" element solid-solute in the $ABO_3$ particle derived from coarse grain is higher than the content rate of the "R" element solid-solute in the $ABO_3$ particle derived from fine grain. Therefore, it is possible to obtain the dielectric particle 20 wherein in the boundary region between the core and the shell, the content rate of the "R" element shows the maximum value.

Hereinbefore, the embodiment of the present invention has been explained, but the present invention is not limited to the above-mentioned embodiment at all, and can be variously modified within a scope of the present invention.

For example, in the above embodiment, a multilayer ceramic capacitor is mentioned as an example of an electronic device into which the dielectric ceramic composition according to the present invention is applied. However, such electronic device into which the dielectric ceramic composition according to the present invention is applied is not limited to a multilayer ceramic capacitor, and may be any as far as it has the above constituted dielectric layer.

EXAMPLES

Hereinafter, the present invention will be explained based on further detailed examples, but the present invention is not limited to these examples.

Example 1

First, $BaTiO_3$ powder having D50 of 200 nm as the raw material of $ABO_3$, and as raw materials of the subcomponent, acetate of Y and powders of $MgCO_3$, $MnCO_3$, $V_2O_5$ and $CaSiO_3$ were respectively prepared. For the Sample No. 8 and 9, as the raw material of the oxide of "R" element, $Y_2O_3$ powder was used. Note that D90/D50 and D50/D10 of the $BaTiO_3$ powder were the values shown in Table 1, and as the solvent of the acetate of Y, water was used. Also, $MgCO_3$ and $MnCO_3$ were to be included in the dielectric ceramic composition as MgO and MnO after firing.

Next, the raw materials of the $BaTiO_3$ powder and subcomponents were mixed by ball mill for 16 hours, and the raw material mixture was prepared. The obtained raw material mixture was dried at 150° C., followed by heat treatment at 600° C. for 2 hours. The raw material mixture after heat treatment was the dielectric raw material.

Note that each added amount of subcomponents was, in terms of each atom, 1.0 mole for $Y_2O_3$, 1.0 mole for MgO, 0.3 mole for MnO, 0.2 mole for $V_2O_5$, 1.5 moles for CaO and 1.5 moles for $SiO_2$ per 100 moles of the $BaTiO_3$ as the main component in the dielectric ceramic composition after firing.

Then, 100 parts by weight of the obtained dielectric raw material and 10 parts by weight of polyvinyl butyral resin, as well as 5 parts by weight of dioctylphthalate (DOP) as the plasticizer and 100 parts by weight of alcohol as the solvent, were mixed by ball mill to form a paste, so that the dielectric layer paste was obtained.

Also, 44.6 parts by weight of Ni particle, 52 parts by weight of terpineol, 3 parts by weight of ethyl cellulose and 0.4 part by weight of benzotriazole were kneaded by triple-roll to form a slurry, so that the internal electrode layer paste was prepared.

Then, by using the above-prepared dielectric layer paste, a green sheet was formed on a PET film. Next, by using the internal electrode layer paste, the electrode layer was printed on the green sheet with a predetermined pattern, followed by removal of the sheet from the PET film, so that the green sheet having the electrode layer was prepared. Then, a plurality of the green sheets having the electrode layer was stacked, and adhered by pressure to obtain a green multilayer body, and this green multilayer body was cut into a predetermined size to obtain a green chip.

Next, the obtained green chip was subjected to binder removal treatment, firing and annealing under the following conditions to obtain an element body as a sintered body.

The binder removal conditions were the temperature rising rate: 20° C./hour, the holding temperature: 300° C., the temperature holding time: 8 hours and the atmosphere: in air.

The firing conditions were the temperature rising rate: rate shown in Table 1, the holding temperature: temperature shown in Table 1 and the holding time: time shown in Table 1. Note that the atmosphere gas was wet mixture gas of $N_2+H_2$, and the oxygen partial pressure was maintained at $10^{-12}$ MPa.

The annealing conditions were the temperature rising rate: 300° C./hour, the holding temperature: 1000° C., the temperature holding time: 2 hours, the temperature descending rate: 300° C./hour, and the atmosphere gas: wet $N_2$ gas (oxygen partial pressure: $10^{-7}$ MPa). Note that the atmosphere gases at the firing and annealing were humidified by a wetter.

Then, end faces of the obtained sintered body was polished by sandblast, followed by coating Cu paste as the external electrode and baking the same, so that a sample of the multilayer ceramic capacitor shown in FIG. 1 was obtained. Size of the obtained capacitor sample was 3.2 mm×1.6 mm×0.6 mm, the thickness of the dielectric layer was 1.9 μm, the thickness of the internal electrode layer was 1.1 μm, and the number of the dielectric layers sandwiched by the internal electrode layers was 200.

As for each of the obtained capacitor samples, the content rate of the "R" element was measured to evaluate whether or not the content rate of the "R" element had the maximum value in the boundary region between the core and the shell. Next, specific permittivity and high temperature accelerated lifetime were measured by the following methods.

(Measurement of Content Rate of "R" Element)

First, the obtained capacitor sample was cut in a plane parallel to the stacking direction, and the cut surface was subjected to surface treatment by using focused ion beam (FIB) system. Next, for the surface treated sample, measurements were performed by using STEM under the conditions of accelerating voltage of 200 kV and spot diameter of 1.5 nm. The obtained characteristic X-ray of Y was subjected to quantitative analysis, and mapping picture of Y was obtained. Note that in each sample, the dielectric particle in which the thickness of the shell was 20 nm or so was selected for measurement, but that for the Sample No. 9, in which there was few dielectric particles having a shell thickness of 20 nm or so, the dielectric particle in which the shell thickness of the shell was 60 nm or so was selected.

By analyzing the obtained mapping picture, the boundary region between the core and the shell in the dielectric particle was determined. Next, in the direction from the outer peripheral portion of the shell to the boundary region between the core and the shell, the content rates of the "R" element on a plurality of points were calculated. For the calculated values, it was evaluated whether the content rate of the "R" element in the boundary region showed the maximum value (Rmax) or not Furthermore, average value (Rave) of the content rate of the "R" element in the shell was calculated to calculate Rmax/Rave. The results are shown in Table 1.

Figure 4:
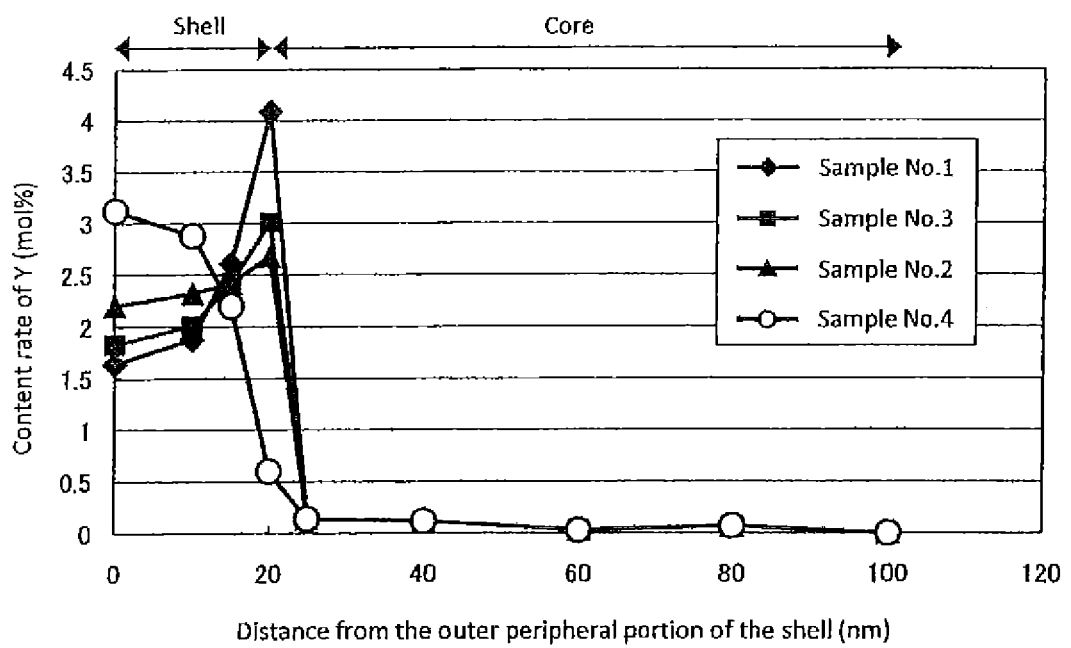
FIG. 4 is a graph showing a distribution of content rate of "R" element in the dielectric particle included in the dielectric ceramic composition of examples and comparative examples of the present invention.

Note that for Sample No. 1 to 4, the results of point analysis from the outer peripheral portion of the shell to the center of the core are shown in FIG. 4.

(Specific Permittivity ∈)

The specific permittivity ∈ (no unit) was calculated based on the capacitance of the capacitor sample measured at reference temperature of 25° C. with a digital LCR meter (4274A manufactured by YHP) under conditions of frequency at 1 kHz and level of input signal (measured voltage) at 1.0 Vrms. In the present examples, higher specific permittivity is more preferable, and 3000 or more was evaluated as being favorable. The results are shown in Table 1.

(High Temperature Accelerated Lifetime (HALT))

The capacitor sample was maintained in the state of applying direct voltage at 160° C. under electric field of 30 V/μm to measure lifetime, by which the high temperature accelerated lifetime was evaluated. In the present example, the time from the start of applying voltage until the insulation resistance was dropped by one digit was determined as breakdown time, and mean time to failure (MTTF) calculated by Weibull analysis of the breakdown time was defined as lifetime. Also, the high temperature accelerated lifetime was evaluated for 10 capacitor samples. In the present examples, 3 hours or more was evaluated as being favorable. The results are shown in Table 1.

TABLE 1

| | Firing conditions | | | Content rate of R element | | | | | | |
|---|---|---|---|---|---|---|---|---|---|---|
| | maximum | holding | temp. | BaTiO$_3$ particle size | | Added form of raw material of R | | Peak at core-shell | | Properties | |
| Sample No. | temp. °C. | time min | rising rate °C./hr | distribution | | | | | | Specific | HALT |
| | | | | D90/D50 | D50/D10 | powder | solution | boudary | Rmax/Rave | permittivity | hours |
| 1 | 1200 | 30 | 500 | 1.4 | 2.1 | | ○ | Observed | 1.6 | 4830 | 24.8 |
| 2 | 1140 | 120 | 500 | 1.4 | 2.1 | | ○ | Observed | 1.11 | 3210 | 3.3 |
| 3 | 1200 | 30 | 300 | 1.4 | 2.1 | | ○ | Observed | 1.3 | 4040 | 13.1 |
| 4 | 1140 | 120 | 300 | 1.4 | 2.1 | | ○ | No | 0.27 | 2670 | 6.6 |
| 5 | 1200 | 30 | 500 | 2.2 | 2.1 | | ○ | Observed | 1.27 | 4300 | 20.1 |
| 6 | 1200 | 30 | 500 | 1.4 | 1.5 | | ○ | Observed | 1.12 | 3490 | 10.5 |
| 7 | 1200 | 30 | 500 | 2.2 | 1.5 | | ○ | Observed | 1.15 | 3680 | 11.7 |
| 8 | 1200 | 30 | 500 | 1.4 | 2.1 | ○ | | Observed | 1.31 | 3330 | 22.1 |
| 9 | 1260 | 120 | 400 | 1.4 | 1.5 | ○ | | No | 1.39 | 2480 | 27.8 |

From FIG. 4 and Table 1, for Sample No. 1 to 3, it was confirmed that in the boundary region between the core and the shell, the content rate of the "R" element became maximized, resulting in combining good specific permittivity and high temperature accelerated lifetime.

On the other hand, for Sample No. 4, it was confirmed that in the outer peripheral portion of the shell, the content rate of the "R" element became maximized, and that specific permittivity was particularly deteriorated. Furthermore, for Sample No. 9, inside the shell, the content rate of the "R" element became maximized. As a result, the thickness of the shell was increased, so that high temperature accelerated lifetime was good while specific permittivity was deteriorated.

Also, it was confirmed from Table 1 that by suitably controlling firing conditions, particle size distribution of raw powder of ABO$_3$, a method for adding raw material of the oxide of "R" element, the effects of the present invention were enhanced.

The invention claimed is:

1. A dielectric ceramic composition comprising
a compound expressed by a formula of $ABO_3$, where "A" is Ba alone, or Ba and at least one selected from Ca and Sr, and "B" is Ti alone, or Ti and Zr, and having a perovskite-type crystal structure, and
an oxide of an "R" element, where the "R" element is at least one selected from Sc, Y, La, Ce, Pr, Nd, Pm, Sm, Eu, Gd, Tb, Dy, Ho, Er, Tm, Yb and Lu,
wherein
said dielectric ceramic composition includes a dielectric particle having a core-shell structure which has a core and a shell, the shell being present around the core and including at least "R" element; and
a maximum content rate of said "R" element exists at a boundary between said core and said shell.

2. The dielectric ceramic composition as set forth in claim 1, wherein
said "R" element is not substantially included in said core, and
in a direction from an outer peripheral portion of said shell toward said boundary of said core and said shell, a content rate of said "R" element is progressively increased.

3. The dielectric ceramic composition as set forth in claim 1, wherein when a maximum value of the content rate of said "R" element is defined as "Rmax" and an average value of content rate of said "R" element in said shell is defined as "Rave", said "Rmax" and said "Rave" satisfy a relation of $1.1 \leq Rmax/Rave \leq 2.0$.

4. The dielectric ceramic composition as set forth in claim 2, wherein when a maximum value of the content rate of said "R" element is defined as "Rmax" and an average value of content rate of said "R" element in said shell is defined as "Rave", said "Rmax" and said "Rave" satisfy a relation of $1.1 \leq Rmax/Rave \leq 2.0$.

5. A ceramic electronic device having a dielectric layer composed of the dielectric ceramic composition as set forth in claim 1, and an electrode.

* * * * *